United States Patent
Goldfarbmuren et al.

(10) Patent No.: US 12,188,717 B2
(45) Date of Patent: Jan. 7, 2025

(54) THERMO-CHEMICAL RECUPERATION SYSTEMS, DEVICES, AND METHODS

(71) Applicant: Rebound Technologies, Inc., Commerce City, CO (US)

(72) Inventors: Russell Goldfarbmuren, Denver, CO (US); Luke Erickson, Denver, CO (US)

(73) Assignee: Rebound Technologies, Inc., Commerce City, CO (US)

( * ) Notice: Subject to any disclaimer, the term of this patent is extended or adjusted under 35 U.S.C. 154(b) by 0 days.

(21) Appl. No.: 18/077,370

(22) Filed: Dec. 8, 2022

(65) Prior Publication Data

US 2023/0175754 A1    Jun. 8, 2023

Related U.S. Application Data

(63) Continuation of application No. 17/352,326, filed on Jun. 20, 2021, now Pat. No. 11,530,863, which is a
(Continued)

(51) Int. Cl.
    *F25D 5/00*      (2006.01)

(52) U.S. Cl.
    CPC ...................................... *F25D 5/00* (2013.01)

(58) Field of Classification Search
    CPC .. F28D 20/025; F28D 20/0056; F24F 5/0017; F28C 3/005; F25D 17/02; F25D 5/00; F25C 2301/002
See application file for complete search history.

(56) References Cited

U.S. PATENT DOCUMENTS

| | | |
|---|---|---|
| 952,040 A | 3/1910 | Hall |
| 1,777,913 A | 10/1930 | Dahl |
| (Continued) | | |

FOREIGN PATENT DOCUMENTS

| | | |
|---|---|---|
| CN | 105157140 | 12/2015 |
| JP | 58-501577 | 9/1983 |
| (Continued) | | |

OTHER PUBLICATIONS

Corrected Notice of Allowance, U.S. Appl. No. 16/813,023, filed Aug. 30, 2022, USPTO.
(Continued)

*Primary Examiner* — Cassey D Bauer
(74) *Attorney, Agent, or Firm* — Wilson Patent Law, LLC

(57) ABSTRACT

Thermo-chemical recuperation systems, devices, and methods are provided in accordance with various embodiments. Embodiments may generally relate to the field of refrigeration and/or heat pumping. Within that field, some embodiments apply to the recuperation or recapturing of both thermal and chemical potential in a freeze point suppression cycle. Some embodiments include a method and/or system of thermo-chemical recuperation that includes creating a flow of ice and flowing a brine against the flow of the ice. Some embodiments manage the thermal and chemical potentials by mixing a dilute brine stream exiting an ice mixing vessel with an ice stream before it enters the ice mixing vessel. By controlling this mixing in a counter-flow or step-wise cross flow manner with sufficient steps, both the thermal and chemical potential of the dilute bine stream may be recuperated.

15 Claims, 8 Drawing Sheets

Related U.S. Application Data continuation of application No. PCT/US2019/067892, filed on Dec. 20, 2019.

(60) Provisional application No. 62/782,378, filed on Dec. 20, 2018.

(56) References Cited

U.S. PATENT DOCUMENTS

| | | | |
|---|---|---|---|
| 2,089,886 A | 8/1937 | Friedrich | |
| 2,590,269 A | 3/1952 | Pike | |
| 2,715,945 A | 8/1955 | Hankison | |
| 3,146,606 A | 9/1964 | Grimes | |
| 3,247,678 A | 4/1966 | Mohlman | |
| 3,257,818 A | 6/1966 | Papapanu | |
| 3,398,543 A | 8/1968 | Horton | |
| 3,526,102 A | 9/1970 | Boylett | |
| 3,747,333 A | 7/1973 | Gertsmann | |
| 3,879,956 A | 4/1975 | Ganiaris | |
| 4,471,630 A | 9/1984 | Sugimoto | |
| 4,531,374 A | 7/1985 | Alefeld | |
| 4,539,076 A | 9/1985 | Swain | |
| 4,584,843 A | 4/1986 | Pronger | |
| 4,809,513 A | 3/1989 | Goldstein | |
| 4,822,391 A | 4/1989 | Rockenfeller | |
| 4,907,415 A | 3/1990 | Stewart | |
| 5,055,185 A | 10/1991 | McMurphy | |
| 5,207,075 A | 5/1993 | Gundlach | |
| 5,255,526 A | 10/1993 | Fischer | |
| 5,394,706 A * | 3/1995 | Keus | B01D 9/004 62/123 |
| 5,632,148 A | 5/1997 | Bronicki | |
| 5,678,626 A | 10/1997 | Gilles | |
| 5,941,089 A | 8/1999 | Takaishi | |
| 6,012,298 A | 1/2000 | Goldstein | |
| 6,038,876 A | 3/2000 | Lang | |
| 6,253,116 B1 | 6/2001 | Zhang | |
| 6,432,566 B1 | 8/2002 | Condit | |
| 7,201,215 B2 | 4/2007 | Ippoushi | |
| 8,522,569 B2 | 9/2013 | Avery | |
| 9,310,140 B2 | 4/2016 | Muren | |
| 9,360,242 B2 | 6/2016 | Muren | |
| 9,593,675 B2 | 3/2017 | Lin | |
| 9,766,017 B2 | 9/2017 | Fujitsuka | |
| 9,885,524 B2 | 2/2018 | Muren | |
| 9,913,411 B2 | 3/2018 | De Bock | |
| 10,584,904 B2 | 3/2020 | Goldfarbmuren | |
| 10,995,993 B2 | 5/2021 | Muren | |
| 11,079,184 B2 | 8/2021 | Goldfarbmuren | |
| 11,255,585 B2 | 2/2022 | Saavedra | |
| 11,460,226 B2 | 10/2022 | Goldfarbmuren | |
| 11,473,818 B2 | 10/2022 | Goldfarbmuren | |
| 11,530,863 B2 | 12/2022 | Goldfarbmuren | |
| 2003/0066906 A1 | 4/2003 | Krause | |
| 2005/0095476 A1 | 5/2005 | Schrooten | |
| 2006/0141331 A1 | 6/2006 | Reiser | |
| 2007/0062853 A1 | 3/2007 | Spani | |
| 2007/0134526 A1 | 6/2007 | Numao | |
| 2007/0137223 A1 | 6/2007 | Brekke | |
| 2008/0083220 A1 | 4/2008 | Shichman | |
| 2008/0142166 A1 | 6/2008 | Carson | |
| 2009/0019861 A1 | 1/2009 | Heckt | |
| 2009/0044935 A1 | 2/2009 | Nutsos | |
| 2009/0293507 A1 | 12/2009 | Narayanamurthy | |
| 2009/0312851 A1 | 12/2009 | Mishra | |
| 2010/0145114 A1 | 6/2010 | Abhari | |
| 2010/0206812 A1 | 8/2010 | Woods | |
| 2010/0218542 A1 | 9/2010 | McCollough | |
| 2010/0218917 A1 | 9/2010 | Barnwell | |
| 2010/0270005 A1 | 10/2010 | Radhakrishnan | |
| 2010/0281907 A1 | 11/2010 | Giertz | |
| 2010/0310954 A1 | 12/2010 | Odgaard | |
| 2011/0023505 A1 | 2/2011 | Popov | |
| 2012/0011886 A1 | 1/2012 | Shiftlett | |
| 2012/0103005 A1 | 5/2012 | Kopko | |
| 2012/0193067 A1 | 8/2012 | Miller | |
| 2013/0199753 A1 | 8/2013 | Muren | |
| 2013/0227983 A1 | 9/2013 | Jeong | |
| 2013/0327407 A1 | 12/2013 | Hermann | |
| 2014/0102662 A1 | 4/2014 | Grama | |
| 2014/0102672 A1 | 4/2014 | Campbell | |
| 2014/0338372 A1 | 11/2014 | Muren | |
| 2015/0083374 A1 | 3/2015 | Clark | |
| 2015/0114019 A1 | 4/2015 | Van Gysel | |
| 2016/0187065 A1 | 6/2016 | Muren | |
| 2016/0290735 A1 | 10/2016 | Muren | |
| 2017/0191707 A1 | 7/2017 | Zhou | |
| 2018/0252477 A1 | 9/2018 | Goldfarbmuren | |
| 2018/0283745 A1 | 10/2018 | Goldfarbmuren | |
| 2019/0137158 A1 | 5/2019 | Goldfarbmuren | |
| 2020/0318867 A1 | 10/2020 | Goldfarbmuren | |
| 2021/0108831 A1 | 4/2021 | Goldfarbmuren | |
| 2021/0389041 A1 | 12/2021 | Goldfarbmuren | |

FOREIGN PATENT DOCUMENTS

| | | |
|---|---|---|
| JP | 62-500257 | 1/1987 |
| JP | 63-161333 | 7/1988 |
| JP | H-1252838 | 10/1989 |
| JP | 06-331225 | 11/1994 |
| JP | 07-055305 | 3/1995 |
| JP | H11-108298 | 4/1999 |
| JP | 11-190566 | 7/1999 |
| JP | 11-264681 | 9/1999 |
| JP | 2002-333170 | 11/2002 |
| JP | 2007-038147 | 2/2007 |
| JP | 2007-187407 | 7/2007 |
| JP | 2008-309360 | 12/2008 |
| JP | 2011-099640 | 5/2011 |
| JP | 2013-124820 | 6/2013 |
| JP | 2013-537474 | 10/2013 |
| JP | 2015-048987 | 3/2015 |
| JP | 2015-210033 | 11/2015 |
| KR | 10-1779368 | 9/2017 |
| WO | WO8301011 | 3/1983 |
| WO | WO8601881 | 3/1986 |
| WO | WO2009070728 | 6/2009 |
| WO | WO2011162669 | 12/2011 |
| WO | WO2011163354 | 12/2011 |
| WO | WO2012036166 | 3/2012 |
| WO | WO2014100330 | 6/2014 |
| WO | WO2014111012 | 7/2014 |
| WO | WO2014191230 | 12/2014 |
| WO | WO2015196884 | 12/2015 |
| WO | WO2016049612 | 3/2016 |
| WO | WO2016081933 | 5/2016 |
| WO | WO2017165378 | 9/2017 |
| WO | WO2018183238 | 10/2018 |
| WO | WO2019165328 | 8/2019 |
| WO | WO2020132467 | 6/2020 |

OTHER PUBLICATIONS

Non-Final Office Action, U.S. Appl. No. 17/000,337, filed Dec. 29, 2021, USPTO.

Notice of Allowance, U.S. Appl. No. 17/000,337, filed May 23, 2022, USPTO.

Corrected Notice of Allowance, U.S. Appl. No. 17/000,337, filed Aug. 26, 2022, USPTO.

Certificate of Grant of Standard Patent by Pre-Registration, Hong Kong Appl. No. 62021031785.0, Feb. 11, 2022, PDHK.

Certificate of Grant of Standard Patent by Pre-Registration, Hong Kong Appl. No. 62020010828.5, Jan. 7, 2022, PDHK.

First Office Action, Canadian Appl. No. 2952665, Jan. 11, 2022, CIPO.

Notice of Allowance, Canadian Appl. No. 2952665, Nov. 18, 2022, CIPO.

Notice of Allowance, Chinese Appl. No. 201980015025, Apr. 27, 2021, CNIPA.

Restriction Requirement, U.S. Appl. No. 17/352,326, filed Mar. 18, 2022, USPTO.

(56) References Cited

OTHER PUBLICATIONS

Non-Final Office Action, U.S. Appl. No. 17/352,326, filed Jul. 7, 2022, USPTO.
Notice of Allowance, U.S. Appl. No. 17/352,326, filed Oct. 26, 2022, USPTO.
Notification of Reason(s) for Refusal, Japanese Appl. No. 2020-544525, Jul. 5, 2022, JPO.
Decision to Grant a Patent, Japanese Appl. No. JP 2020-544525, Feb. 7, 2023, JPO.
Nicholls, J., Thermal Approach to Grid Energy Storage, Oregon Future Energy Conference, Apr. 26, 2012, available at http://ns2.thesegurogroup.com/event/images/stories/PDFs/4b_nicholls.pdf.
Nishimura, S., Ultra Eco-Ice System, Feb. 3, 2014, available at http://www.atmo.org/media.presentation.php?id=371.
Rebound Technologies, "Lab notebook: icepoint™ is ready to keep your ice cream cold," Jan. 20, 2015, https://www.rebound-tech.com/lab-notebook-icepoint-is-ready-to-keep-your-ice-cream-cold/ (last visited Jan. 26, 2021).
International Search Report and Written Opinion, Int'l Appl. No. PCT/2019/019323, Apr. 26, 2019, ISA-USPTO.
Extended European Search Report and Search Opinion, European Appl. No. 19757572.3, Nov. 8, 2021, EPO.
First Examination Report, European Appl. No. 19757572.3, Aug. 30, 2022, EPO.
International Search Report and Written Opinion, Int'l Appl. No. PCT/US18/024436, Jun. 15, 2018, ISA-USPTO.
Extended European Search Report and Search Opinion, European Appl. No. 18777347.8, Nov. 18, 2020, EPO.
First Office Action, Chinese Appl. No. 201880035102.3, Jul. 16, 2020, CNIPA.
Notification of Grant of Patent, Chinese Appl. No. 201880035102.3, Feb. 2, 2021, CNIPA.
Notification of Reasons(s) for Refusal, Japanese Appl. No. JP2019-553031, Apr. 6, 2021, JPO.
Notification of Reasons(s) for Refusal, Japanese Appl. No. JP2019-553031, Oct. 19, 2021, JPO.
Decision of Refusal, Japanese Appl. No. JP 2019-553031, Jun. 21, 2022, JPO.
International Search Report and Written Opinion, Int'l Appl. No. PCT/US2015/052521, Dec. 14, 2015, ISA-USPTO.
Extended European Search Report and Search Opinion, European Appl. No. 15844161.8, Apr. 26, 2018, EPO.
First Examination Report, European Appl. No. 15844161.8, Mar. 13, 2019, EPO.
Intention to Grant, European Appl. No. 15844161.8, Sep. 30, 2019, EPO.
First Office Action, Japanese Appl. No. JP 2016-576018, Aug. 6, 2019, JPO.
Decision to Grant a Patent, Japanese Appl. No. JP 2016-576018, Jun. 30, 2020, JPO.
International Search Report and Written Opinion, Int'l Appl. No. PCT/US17/023356, Jun. 16, 2017, ISA-USPTO.
Extended European Search Report and Search Opinion, European Appl. No. 17770960.7, Oct. 30, 2019, EPO.
Notification of Reasons(s) for Refusal, Japanese Appl. No. JP 2018-549561, Feb. 16, 2021, JPO.
International Search Report and Written Opinion, Int'l Appl. No. PCT/US2019/067892, Feb. 20, 2020, ISA-USPTO.
Non-Final Office Action, U.S. Appl. No. 13/761,463, filed Aug. 20, 2015, USPTO.
Notice of Allowance, , U.S. Appl. No. 13/761,463, filed Jan. 13, 2016, USPTO.
Notice of Allowance, U.S. Appl. No. 15/090,756, filed Aug. 21, 2017, USPTO.
Notice of Allowance, U.S. Appl. No. 15/090,756, filed Oct. 25, 2017, USPTO.
Restriction Requirement, U.S. Appl. No. 15/855,048, filed Mar. 8, 2019, USPTO.
Non-Final Office Action, U.S. Appl. No. 15/855,048, filed Jun. 10, 2019, USPTO.
Final Office Action, U.S. Appl. No. 15/855,048, filed Feb. 27, 2020, USPTO.
Advisory Action, U.S. Appl. No. 15/855,048, filed Jun. 9, 2020, USPTO.
Notice of Panel Decision from Pre-Appeal Brief Review, U.S. Appl. No. 15/855,048, filed Oct. 5, 2020, USPTO.
Notice of Allowance, U.S. Appl. No. 15/855,048, filed Apr. 14, 2021, USPTO.
Notice of Allowance, U.S. Appl. No. 14/280,080, filed Mar. 28, 2016, USPTO.
Restriction Requirement, U.S. Appl. No. 14/865,727, filed Jul. 27, 2017, USPTO.
Non-Final Office Action, U.S. Appl. No. 14/865,727, filed Dec. 1, 2017, USPTO.
Final Office Action, U.S. Appl. No. 14/865,727, filed Aug. 6, 2018, USPTO.
Advisory Action, U.S. Appl. No. 14/865,727, filed Oct. 24, 2018, USPTO.
Non-Final Office Action, U.S. Appl. No. 14/865,727, filed Mar. 18, 2019, USPTO.
Final Office Action, U.S. Appl. No. 14/865,727, filed Dec. 23, 2019, USPTO.
Notice of Panel Decision from Pre-Appeal Brief Review, U.S. Appl. No. 14/865,727, filed Nov. 6, 2020, USPTO.
Notice of Allowance, U.S. Appl. No. 14/865,727, filed Nov. 13, 2020, USPTO.
Notice of Allowance, U.S. Appl. No. 14/865,727, filed Feb. 23, 2021, USPTO.
Non-Final Office Action, U.S. Appl. No. 16/136,452, filed Apr. 22, 2020, USPTO.
Final Office Action, U.S. Appl. No. 16/136,452, filed Dec. 21, 2020, USPTO.
Restriction Requirement, U.S. Appl. No. 15/935,005, filed Jun. 20, 2019, USPTO.
Notice of Allowance, U.S. Appl. No. 15/935,005, filed Oct. 8, 2019, USPTO.
Notice of Allowance, U.S. Appl. No. 16/813,023, filed Oct. 27, 2020, USPTO.
Notice of Allowance, U.S. Appl. No. 16/813,023, filed Dec. 9, 2020, USPTO.
Notice of Allowance, U.S. Appl. No. 16/813,023, filed Mar. 10, 2021, USPTO.
Non-Final Office Action, U.S. Appl. No. 16/813,023, filed Aug. 5, 2021, USPTO.
Final Office Action, U.S. Appl. No. 16/813,023, filed Mar. 2, 2022, USPTO.
Notice of Allowance, U.S. Appl. No. 16/813,023, filed Jun. 9, 2022, USPTO.

\* cited by examiner

THERMO-CHEMICAL RECUPERATION SYSTEMS, DEVICES, AND METHODS

CROSS-REFERENCES TO RELATED APPLICATIONS

This application is a non-provisional patent application claiming priority benefit of U.S. provisional patent application Ser. No. 62/782,378, filed on Dec. 20, 2018 and entitled "THERMO-CHEMICAL RECUPERATION SYSTEMS, DEVICES, AND METHODS," the entire disclosure of which is herein incorporated by reference for all purposes. This non-provisional patent application is a continuation of International PCT Appl. No. PCT/US2019/067892, filed on Dec. 20, 2019, and is a continuation of U.S. non-provisional application Ser. No. 17/352,326, filed on Jun. 20, 2021 and issued as U.S. Pat. No. 11,530,863 on Dec. 20, 2022.

GOVERNMENT LICENSE RIGHTS

This invention was made with U.S. Government support under Contract 1533939 awarded by the National Science Foundation. The U.S. Government has certain rights in the invention.

BACKGROUND

Energy transfer between different materials may be performed in a variety of ways. Heat exchangers, for example, may be utilized to transfer heat between one or more fluids. Heat exchangers may be utilized in a wide variety of technologies such as space heating, refrigeration, and air conditioning. A recuperator may provide a specific type of heat exchanger that may facilitate heat transfer inside a system to increase efficiency, for example.

While some technologies may have the ability to move heat around, such as heat exchangers, there may be a general need for new tools and techniques to recuperate heat and/or energy.

SUMMARY

Thermo-chemical recuperation systems, devices, and methods are provided in accordance with various embodiments. Embodiments may generally relate to the field of refrigeration and/or heat pumping. Within that field, some embodiments apply to the recuperation or recapturing of both thermal and chemical potential in a freeze point suppression cycle.

Some embodiments manage the thermal and chemical potentials by mixing a dilute brine stream exiting an ice mixing vessel with an ice stream before it enters the ice mixing vessel. By controlling this mixing in a counter-flow or step-wise cross flow manner with sufficient steps, both the thermal and chemical potential of the dilute bine stream may be recuperated.

Some embodiments involve creating an ice flow using either mechanical, gravitational, hydraulic, and/or pneumatic means and simultaneously flowing dilute brine against the ice flow by either gravitational or cyclic spraying means. The counter-flow type mixing, for example, may exchange both the thermal and chemical potential in the dilute brine and may pre-chill the ice before it may enter the ice mixing vessel. Furthermore, the melting of ice at a relatively high temperature of the dilute brine may produce a diluting effect in the brine that does not affect the ice mixing vessel. By removing this water before the material reaches the ice mixing vessel and at a temperature equal to or greater than the ice mixing vessel, the work involved in the separator may be decreased.

For example, some embodiments include a method of thermo-chemical recuperation that includes creating a flow of ice and flowing a brine against the flow of the ice. In some embodiments, flowing the brine against the flow of the ice includes forming a counter flow of the brine against the flow of the ice. In some embodiments, flowing the brine against the flow of the ice includes forming a step-wise cross flow of the brine against the flow of the ice. In some embodiments, forming the step-wise cross flow of the brine against the flow of the ice includes cyclically injecting the brine at multiple points with respect to the flow of the ice.

In some embodiments, flowing the brine against the flow of the ice reduces a temperature of the brine. In some embodiments, flowing the brine against the flow of the ice dilutes the brine. In some embodiments, flowing the brine against the flow of the ice reduces a temperature of the ice.

Some embodiments of the method include delivering the flow of the ice to an ice tank after flowing the brine against the flow of the ice. Some embodiments include passing the brine through a separator after the brine flows against the flow of the ice. In some embodiments, the separator forms at least a concentrated brine or water from the brine. Some embodiments include freezing the water from the separator to form ice for the flow of the ice. Some embodiments include combining the ice in an ice tank with the concentrated brine after flowing the brine against the flow of the ice.

In some embodiments of the method, flowing the brine against the flow of the ice utilizes gravity for flowing the brine against the flow of the ice. In some embodiments, creating the flow of the ice flows the ice against gravity. In some embodiments, creating the flow of the ice flows the ice with gravity.

In some embodiments, the flow of the ice and flowing the brine against the flow of the ice occurs horizontally. In some embodiments, the flow of the ice and flowing the brine against the flow of the ice that occurs horizontally includes flowing the ice and the brine through a tube that includes a horizontal portion. Some embodiments include utilizing an auger to pack the ice into the tube that includes the horizontal portion.

In some embodiments, creating the flow of the ice utilizes at least an auger or a chain conveyor. Some embodiments may utilize a bucket conveyor.

Some embodiments include a thermo-chemical recuperation system that may include: one or more ice flow channels; and one or more brine ports where the one or more ice flow channels and the one or more brine ports are positioned with respect to each other such that a flow of brine from the one or more brine ports is against a flow of the ice through the one or more ice flow channels.

In some embodiments of the system, at least the one or more ice flow channels or the one or more brine ports are positioned to form a counter flow of the brine against the flow of the ice. In some embodiments, at least the one or more ice flow channels or the one or more brine ports are positioned to form a step-wise cross flow of the brine against the flow of the ice. In some embodiments of the system, the step-wise cross flow of the brine against the flow of the ice includes cyclically injecting the brine from multiple brine ports from the one or more brine ports with respect to the flow of the ice through the one or more ice flow channels.

In some embodiments, at least the one or more ice flow channels or the one or more brine ports are positioned such that the brine flows with gravity against the flow of the ice.

In some embodiments, at least the one or more ice flow channels or the one or more brine ports are positioned such that the flow of the ice flows the ice against gravity. In some embodiments, at least the one or more ice flow channels or the one or more brine ports are positioned such that the flow of the ice flows the ice with gravity. In some embodiments, one or more brine ports are positioned such that flow of the ice and the flow of the brine against the flow of the ice occurs horizontally.

Some embodiments of the system include an auger positioned with respect to the one or more ice flow channels to create the flow of the ice. Some embodiments include a chain conveyor positioned with respect to the one or more ice flow channels to create the flow of the ice. Some embodiments include an ice tank positioned to receive the flow of the ice after the ice flows through the one or more ice channels.

In some embodiments of the system, the one or more ice flow channels include at least a tube that includes a horizontal portion. Some embodiments include an auger that packs the ice into the tube that includes the horizontal portion.

Some embodiments of the system include a separator positioned to receive the brine after the brine flows against the flow of the ice. In some embodiments, the separator forms at least a concentrated brine or water from the brine. In some embodiments, the separator is coupled with the ice tank such that the concentrated brine is delivered to the ice tank. Some embodiments include an ice maker to form the ice for the flow of the ice. In some embodiments, the separator is coupled with the ice maker such that the water from the separator is delivered to the ice maker to form the ice for the flow of the ice.

Some embodiments include methods, systems, and/or devices as described in the specification and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
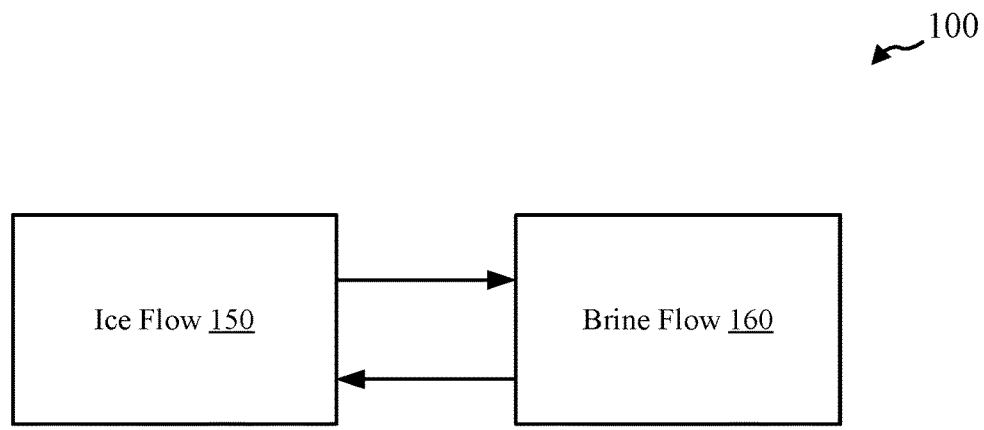
FIG. 1A shows a system and/or device in accordance with various embodiments.

This description provides embodiments, and is not intended to limit the scope, applicability, or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted, or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Thermo-chemical recuperation systems, devices, and methods are provided in accordance with various embodiments. Embodiments generally relate to the field of refrigeration and/or heat pumping. Within that field, some embodiments apply to the recuperation or recapturing of both thermal and chemical potential in a freeze point suppression cycle.

For example, some embodiments provide an approach to recuperate unused thermal and chemical potential in a freeze point suppression cycle. Within this type of thermodynamic cycle, two components may be included: an ice mixing vessel and a separator. Fluid may move from the ice mixing vessel to the separator in a dilute form and back to the ice mixing vessel as a concentrate after water is removed in the separator. Managing the fluid's thermal and chemical potential in these two forms is generally important to overall system efficiency.

For the purpose of freeze point suppression cycles, thermal potential generally means the ability to provide cooling (i.e., a low temperature), while chemical potential generally means the ability to produce a cold temperature spontaneously without requiring work. An example of a thermal potential is a brine at a low temperature. An example of a chemical potential is a brine at a high concentration that, when mixed with ice, spontaneously cools to a low temperature.

Some embodiments manage these potentials by mixing the dilute stream exiting the ice mixing vessel with the ice stream before it enters the ice mixing vessel. By controlling this mixing in a counter-flow or step-wise cross flow manner with sufficient steps, both the thermal and chemical potential of the dilute stream may be recuperated, in some cases optimally.

Some embodiments involve creating an ice flow using either mechanical, gravitational, hydraulic, or pneumatic means and simultaneously flowing dilute brine against the ice flow by either gravitational or cyclic spraying means. The counter-flow type mixing, for example, may exchange both the thermal and chemical potential in the dilute brine and may pre-chill the ice before it may enter the ice mixing vessel. Furthermore, the melting ice at a relatively high temperature of the dilute brine may produce a diluting effect in the brine that does not affect the ice mixing vessel. By removing this water before the material reaches the ice mixing vessel and at a temperature equal to or greater than the ice mixing vessel, the work involved in the separator may be decreased.

Some embodiments may be constructed from many interchangeable components. For example, if the ice is to move against the direction of gravity, a mechanical conveyor might be used like an auger conveyor, chain conveyor, bucket conveyor, or belt conveyor. In this configuration, the brine may be injected high in the system and may be allowed to flow down by gravity over the ice as it moves up.

In a case where the ice may instead be allowed to move with gravity down, the brine may be pumped in stages to be sprayed over the ice as it falls. For example, by creating many discrete step-wise cross flow interactions like this, the overall performance may approach a true counter-flow configuration.

The description herein may generally refer to ice and brines. In general, the brines may be formed from a freeze point suppressant combined with a solid that may be melted to form the brine; in some embodiments, the brines may be formed from concentrating a diluted brine utilizing a separator. Merely by way of example, the freeze point suppressant may include, but is not limited to: water, alcohol, ionic liquids, amines, ammonia, salt, non-salt soluble solids, organic liquid, inorganic liquid, triethylamine, cyclohexopuridine, mixtures of miscible materials, and/or a surfactant-stabilized mixture of immiscible materials. The solid may include a fully or partially solid form of the following, but is not limited to water, an organic material, an ionic liquid, an inorganic material, and/or DMSO. In general, the systems, devices, and/or methods provided in accordance with various embodiments include a brine that may get diluted as it is either mixed with ice, such as in an ice mixing vessel, and/or flows against an ice flow and melts the ice. The brine may then be concentrated utilizing a separator in some cases. The concentrated brine may be sent back to the ice mixing vessel where it may be combined with ice to form a usefully cold refrigerant.

A wide variety of different components may be utilized with respect to the systems, devices, and/or methods described herein. Merely by way of the example, some embodiments include a separator as noted above (generally referred to as reference number 105) that may include, but are not limited to, a thermal separator or a mechanical separator; some embodiments may utilize a distillation column. Separators may utilize a wide variety of separation techniques including, but not limited to, reverse osmosis, nano-filtration, photonic-driven precipitation, precipitation by chemical reaction, precipitation by solubility change, surfactant absorption, ion exchange, activated carbon absorption, flash separation, distillation, multi-effect distillation, vapor compression distillation, evaporation, membrane distillation, and/or gas permeable membrane separation.

Below is a description of several systems and/or methods in accordance with various embodiments. Many of the specific components are interchangeable with other common devices. For example, an auger may be replaced by a chain conveyor or bucket conveyor.

Turning now to FIG. 1A, a thermo-chemical recuperation system 100 in accordance with various embodiments is provided. System 100 may include an ice flow 150 and a brine flow 160. System 100 may be configured to create a flow of ice, such as ice flow 150, and flowing a brine, such as brine flow 160, against the flow of the ice. In some embodiments, flowing the brine from brine flow 160 against the flow of the ice from ice flow 150 includes forming a counter flow of the brine against the flow of the ice. In some embodiments, flowing the brine from brine flow 160 against the flow of the ice from ice flow 150 includes forming a step-wise cross flow of the brine against the flow of the ice. In some embodiments, forming the step-wise cross flow of the brine against the flow of the ice includes cyclically injecting the brine at a plurality of points with respect to the flow of the ice.

In some embodiments of system 100, flowing the brine from brine flow 160 against the flow of the ice from ice flow 150 reduces a temperature of the brine. In some embodiments, flowing the brine against the flow of the ice dilutes the brine. In some embodiments, flowing the brine against the flow of the ice reduces a temperature of the ice. Merely by way of example, the ice entering the ice flow 150 may start at a temperature of 0 degrees Celsius, while the brine entering the brine flow 160 may enter at a temperature of −10 degrees Celsius; when the ice leaves the ice flow 150 it may be at a temperature of −28 degrees Celsius, while the temperature of the brine when it leaves the brine flow 160 may be at −28 degrees Celsius. Other temperatures may be applicable, though in general, flowing the brine from brine flow 160 against the ice from ice flow 150 may reduce a temperature of the brine and/or a temperature of the ice.

Some embodiments of the system 100 include delivering the flow of the ice from ice flow 150 to an ice tank after flowing the brine against the flow of the ice. Some embodiments include passing the brine from brine flow 160 through a separator after the brine flows against the flow of the ice. In some embodiments, the separator forms at least a concentrated brine or water from the brine. Some embodiments include freezing the water from the separator to form ice for the flow of the ice for ice flow 150. Some embodiments include combining the ice in an ice tank with the concentrated brine after flowing the brine from brine flow 160 against the flow of the ice from ice flow 150.

In some embodiments of the system 100, flowing the brine from brine flow 160 against the flow of the ice from ice flow 150 utilizes gravity for flowing the brine against the flow of the ice. In some embodiments, creating the flow of the ice flows the ice against gravity. In some embodiments, creating the flow of the ice flows the ice with gravity.

In some embodiments of system 100, the flow of the ice from ice flow 150 and flowing the brine from brine flow 160 against the flow of the ice occurs horizontally. In some embodiments, the flow of the ice and flowing the brine against the flow of the ice that occurs horizontally includes flowing the ice and the brine through a tube that includes a horizontal portion. Some embodiments include utilizing an auger to pack the ice into the tube that includes the horizontal portion.

In some embodiments, creating the flow of the ice from ice flow 150 utilizes at least an auger or a chain conveyor. Some embodiments may utilize a bucket conveyor.

Figure 1B:
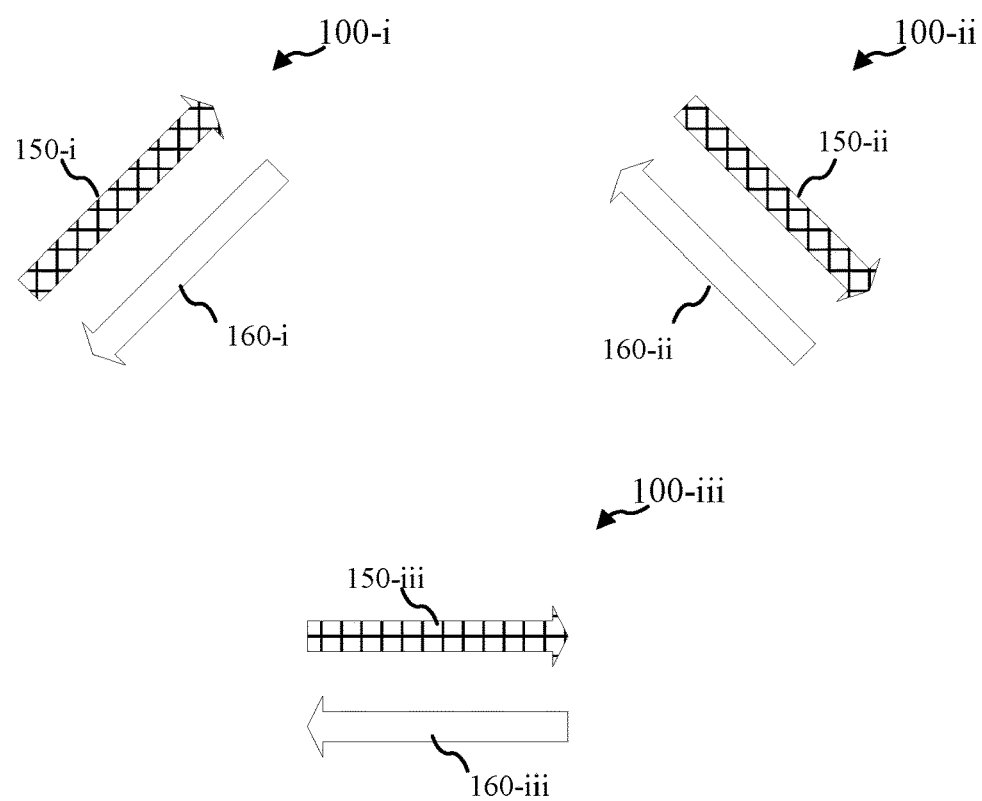
FIG. 1B shows systems and/or devices in accordance with various embodiments.

FIG. 1B shows several system configurations 100-*i*, 100-*ii*, and 100-*iii* in accordance with various embodiments. These configurations may be examples of system 100 of FIG. 1A. In particular, system configuration 100-*i* includes a brine flow 160-*i* that may flow against an ice flow 150-*i*, which may be an example of a counter flow. In this configuration, the ice flow 150-*i* may flow against gravity, while the brine flow 160-*i* may flow with gravity. System configuration 100-*ii* includes a brine flow 160-*ii* that may flow against an ice flow 150-*ii*, which may be an example of a counter flow or a step-wise cross flow, which may approximate a counter flow. With a step-wise cross flow, the brine flow 160-*ii* may include multiple steps that may be across the ice flow 150-*ii*, which may create a form of counter flow when taken as a whole. In this configuration, the ice flow 150-*ii* may flow with gravity, while the brine flow 160-*ii* may flow against gravity. The brine flow 160-*ii* may be pumped against gravity to create the brine flow 160-*ii* against the ice flow 150-*ii*, for example; aspects of brine flow 160-*ii* may flow with gravity, such as part of the cross flow with respect that may flow across the ice flow 150-*ii*. System configuration 100-*iii* includes a brine flow 160-*iii* that flows against an ice flow 150-*iii*, which may be an example of a counter flow or a step-wise counter flow. In this example, the brine flow 160-*iii* and the ice flow 150-*iii* may occur horizontally.

Figure 1C:
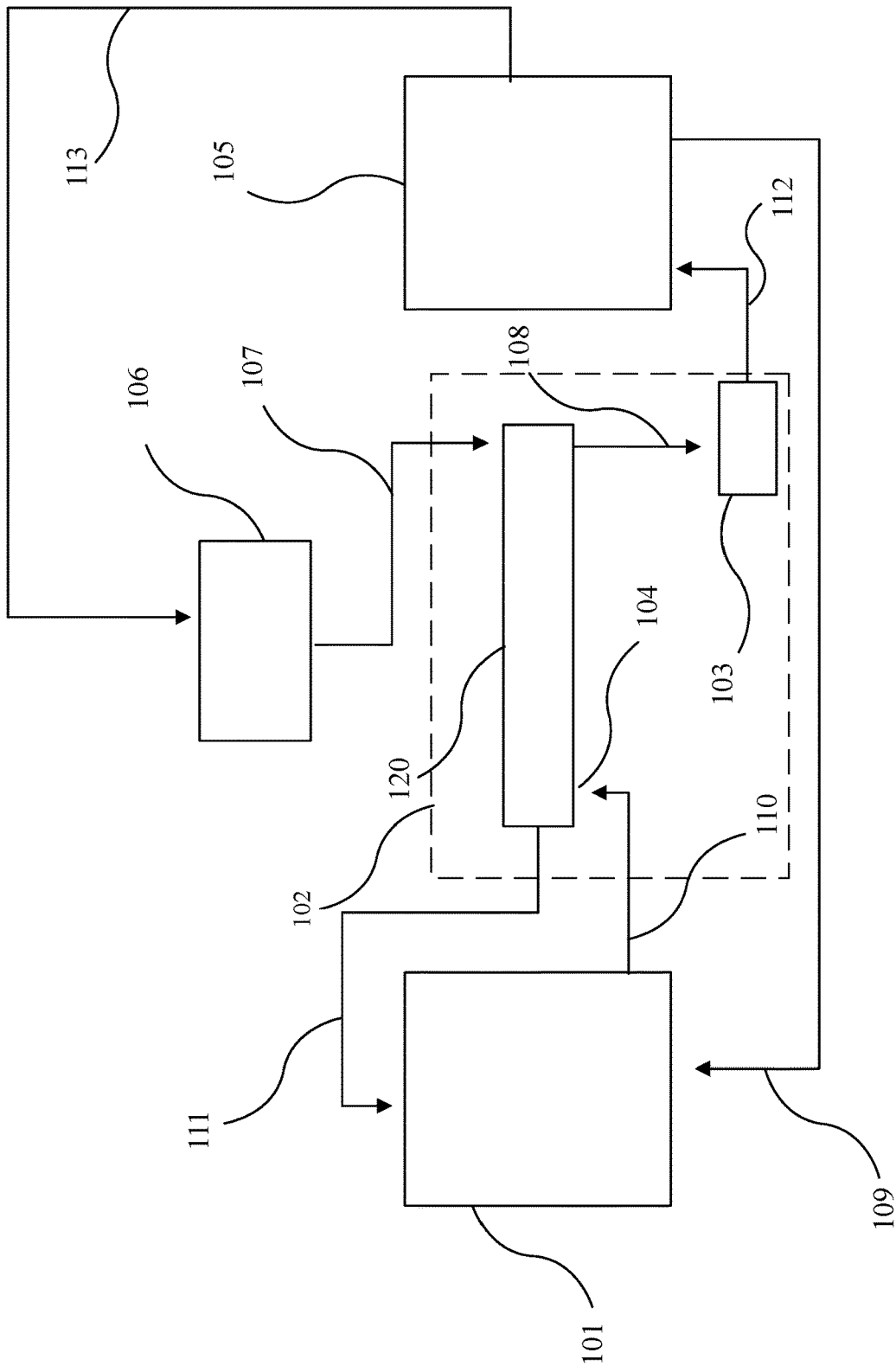
FIG. 1C shows a system and/or device in accordance with various embodiments.

FIG. 1C shows a thermo-chemical recuperation system 100-*iv* in accordance with various embodiments. System 100-*iv* may be an example of system 100 of FIG. 1A, system 100-*i* of FIG. 1B, system 100-*ii* of FIG. 1B, and/or system 100-*iii* of FIG. 1B. A dilute brine 110 may be removed from an ice mixing vessel 101 (which may also be referred to as an ice tank) and may be sent to a thermo-chemical recuperator 102 via one or more injection ports 104. The thermo-chemical recuperator 102 may include one or more ice flow channels 120; the one or more injection ports 104 may be referred to as brine ports. On the other end of the recuperator 102, ice 107 may be fed in. The ice 107 and brine 110 may flow against each other that may produce a chilled ice 111 and further dilute brine 108; the resulting flow of ice 107 may be an example of the ice flows 150 from FIG. 1A and/or FIG. 1B, while the flow of the brine 110 may be an example of the brine flows 160 from FIG. 1A and/or FIG. 1B. The flow of ice 107 and the flow of brine 110 may be counter to each other in some embodiments; in some embodiments, the flow of brine 110 may form a step-wise cross flow against the flow of ice 107. The chilled ice 111 may flow into the ice mixing vessel 101. The further dilute brine 108 may be collected in a brine collection vessel 103 (which may be a brine collection point in some embodiments) and then may flow 112 to a separator 105. The separator 105 may produce concentrated brine 109 and/or water 113; the water may be pure in some cases. The water 113 may be frozen in an ice maker 106, after which it may be fed again to recuperator 102. The concentrated brine 109 may be sent to the ice mixing vessel 101, where it may be mixed with ice.

In general, system 100-*iv* may utilize the one or more ice flow channels 120 of thermo-chemical recuperator 102 and the one or more brine ports 104, where the one or more ice flow channels 120 of thermo-chemical recuperator 102 and the one or more brine ports 104 may be positioned with respect to each other such that a flow of the brine 110 from the one or more brine ports 104 may be against a flow of the ice 107 through the one or more ice flow channels 120 of the thermo-chemical recuperator 102.

In some embodiments of the system 100-*iv* at least the one or more ice flow channels 120 of the thermo-chemical recuperator 102 or the one or more brine ports 104 are positioned to form a counter flow of the brine 110 against the flow of the ice 107. In some embodiments, at least the one or more ice flow channels 120 of the thermo-chemical recuperator 102 or the one or more brine ports 104 are positioned to form a step-wise cross flow of the brine 110 against the flow of the ice 107. In some embodiments of the system 100-*iv*, the step-wise cross flow of the brine 110 against the flow of the ice 107 includes cyclically injecting the flow of the brine 110 at multiple ports from the one or more brine ports 104 with respect to the flow of the ice 107 through the one or more ice flow channels 120 of the thermo-chemical recuperator 102.

In some embodiments of system 100-*iv*, at least the one or more ice flow channels 120 from the thermo-chemical recuperator 102 or the one or more brine ports 104 are positioned such that the brine 110 flows with gravity against the flow of the ice 107. In some embodiments, at least the one or more ice flow channels 120 of the thermo-chemical recuperator 102 or the one or more brine ports 104 are positioned such that the flow of the ice 107 flows the ice against gravity. In some embodiments, at least the one or more ice flow channels 120 of the thermo-chemical recuperator 102 or the one or more brine ports 104 are positioned such that the flow of the ice 107 flows the ice with gravity. In some embodiments, the one or more brine ports 104 are positioned such that flow of the ice 107 and the flow of the brine 110 against the flow of the ice 107 occurs horizontally.

Some embodiments of the system 100-*iv* include an auger positioned with respect to the one or more ice flow channels 120 of the thermo-chemical recuperator 102 to create the flow of the ice 107. Some embodiments include a chain conveyor positioned with respect to the one or more ice flow channels 120 of the thermo-chemical recuperator 102 to create the flow of the ice 107. Bucket and/or belt conveyors may also be utilized. Some embodiments include the ice tank 101 positioned to receive the flow of the ice 107 (referred to as ice 111) after the ice flows through the one or more ice channels 120 of the thermo-chemical recuperator 102.

In some embodiments of the system 100-*iv*, the one or more ice flow channels 120 of the thermo-chemical recuperator 102 include at least a tube that includes a horizontal portion. Some embodiments include an auger that packs the ice 107 into the tube that includes the horizontal portion.

Some embodiments of the system 100-*iv* include the separator 105 positioned to receive the brine 110 after the brine flows against the flow of the ice 107; this may be referred to as brine 108 and/or brine 112. In some embodiments, the separator 105 forms at least a concentrated brine 109 or water 113 from the brine 112. In some embodiments, the separator 105 is coupled with the ice tank 101 such that the concentrated brine 109 is delivered to the ice tank 101; ice (such as ice 111) may be combined with the concentrated brine 109 in the ice tank 101. Some embodiments include the ice maker 106 to form the ice 107 for the flow of the ice. In some embodiments, the separator 105 is coupled with the ice maker 106 such that the water 113 from the separator 105 is delivered to the ice maker 106 to form the ice 107 for the flow of the ice.

Figure 2:
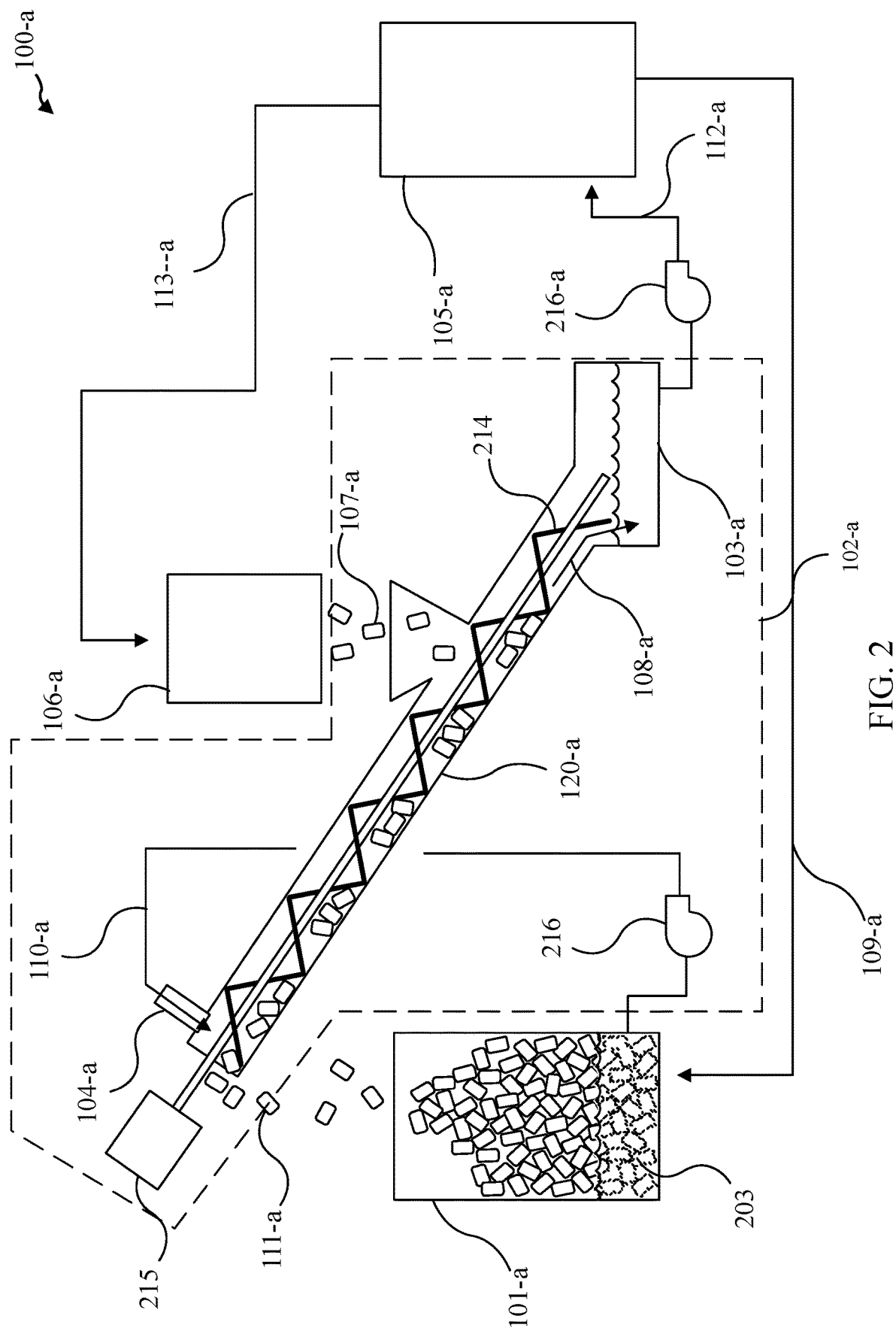
FIG. 2 show a system and/or device in accordance with various embodiments.

FIG. 2 shows an example of a thermo-chemical recuperator system 100-*a* in accordance with various embodiments. System 100-*a* may be an example of system 100 of FIG. 1A, system 100-*i* of FIG. 1B, and/or system 100-*iv* of FIG. 1C. A dilute brine 110-*a* may be pumped into a thermo-chemical recuperator 102-*a* via a liquid pump 216 from an ice mixing vessel 101-*a*, which may also be referred to as an ice tank; a mix of ice and a freeze point suppressant 203 that may form the dilute brine 110-*a* may be shown within the ice mixing vessel 101-*a*. The dilute brine 110-*a* may be injected into an ice flow channel 120-*a* of the thermo-chemical recuperator 102-*a* via an injection brine port 104-*a* where it may flow by gravity down toward a brine collection vessel 103-*a*. An auger 214 inside the ice flow channel 120-*a* may be rotated by a motor 215 and may mechanically move ice 107-*a* up the ice flow channel 120-*a* against gravity. The ice 107-*a* and brine 110-*a* may move counter to each other and that mixing may produce chilled ice 111-*a* and further dilute brine 108-*a*; this may provide an example of how the flow of the brine 110-*a* may be against the flow of the ice 107-*a*. The chilled ice 111-*a* may fall into the ice mixing vessel 101-*a* by the mechanical motion produced by the auger 214. The further dilute brine 108-*a* may be pumped by a liquid pump 216-*a* as flow 112-*a* to a separator 105-*a* where it may be separated to produce water 113-*a*, which may be pure, and/or concentrated brine 109-*a*. The concentrated brine 109-*a* may flow back to the ice tank 101-*a* and the water may flow to an ice maker 106-*a*, where it may be turned into ice 107-*a*.

Figure 3:
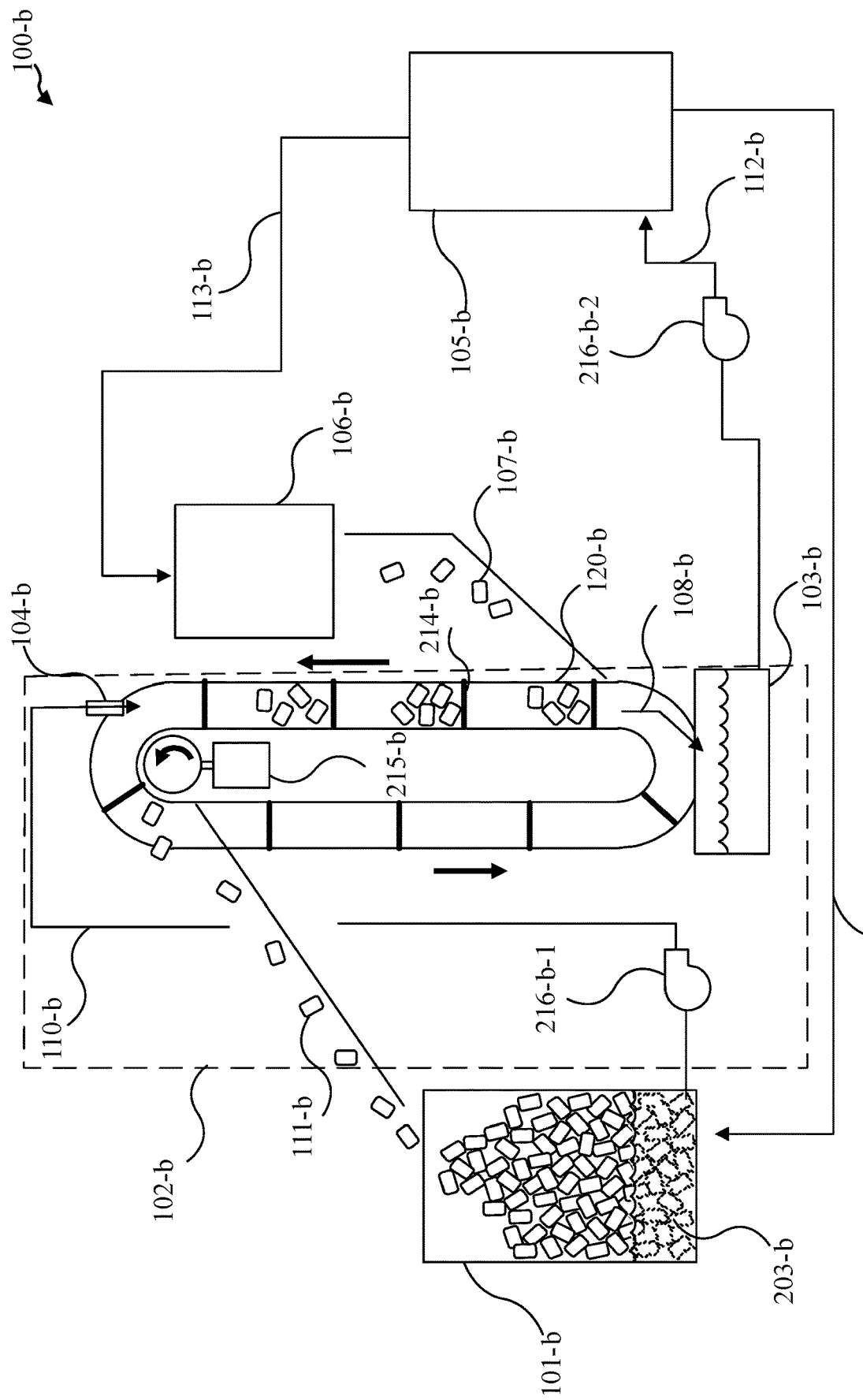
FIG. 3 shows a system and/or device in accordance with various embodiments.

FIG. 3 shows an example of a thermo-chemical recuperation system 100-*b* in accordance with various embodiments. System 100-*b* may be an example of system 100 of FIG. 1A, system 100-*i* of FIG. 1B, and/or system 100-*iv* of FIG. 1C. A dilute brine 110-*b* may be pumped into a thermo-chemical recuperator 102-*b* via a liquid pump 216-*b*-1 from an ice mixing vessel 101-*b*, which may also be referred to as an ice tank; a mix of ice and brine 203-*b* within the ice-mixing vessel 101-*b* may be shown. The brine 110-*b* may be injected into an ice flow channel 120-*b* of the thermo-chemical recuperator 102-*b* via an injection brine port 104-*b* where it may flow by gravity down toward a brine collection vessel 103-*b*. A chain conveyor 214-*b* inside the ice flow channel 120-*b* of the thermo-chemical recuperator 102-*b* may be rotated by a motor 215-*b* such that ice 107-*b* may be conveyed up against the flow of dilute brine 110-*b*; the flow of ice 107-*b* may also be against gravity. The ice 107-*b* and brine 110-*b* may move counter to each other and that mixing may produce chilled ice 111-*b* and/or further dilute brine 108-*b*; this may provide an example of how the flow of the brine 110-*b* may be against the flow of the ice 107-*b*. The chilled ice 111-*b* may fall into the ice mixing vessel 101-*b* by gravity from the top of the chain conveyor 214-*b*. The further dilute brine 108-*b* may be pumped by a liquid pump 216-*b*-2 as flow 112-*b* to a separator 105-*b* where it may be separated to produce water 113-*b*, which may be pure, and/or concentrated bring 109-*b*. The concentrated bring 109-*b* may flow back to the ice tank 101-*b* and the water 113-*b* may flow to an ice maker 106-*b* where it may be turned into ice, which again may be introduced into the thermo-chemical recuperator 102-*b*.

Figure 4:
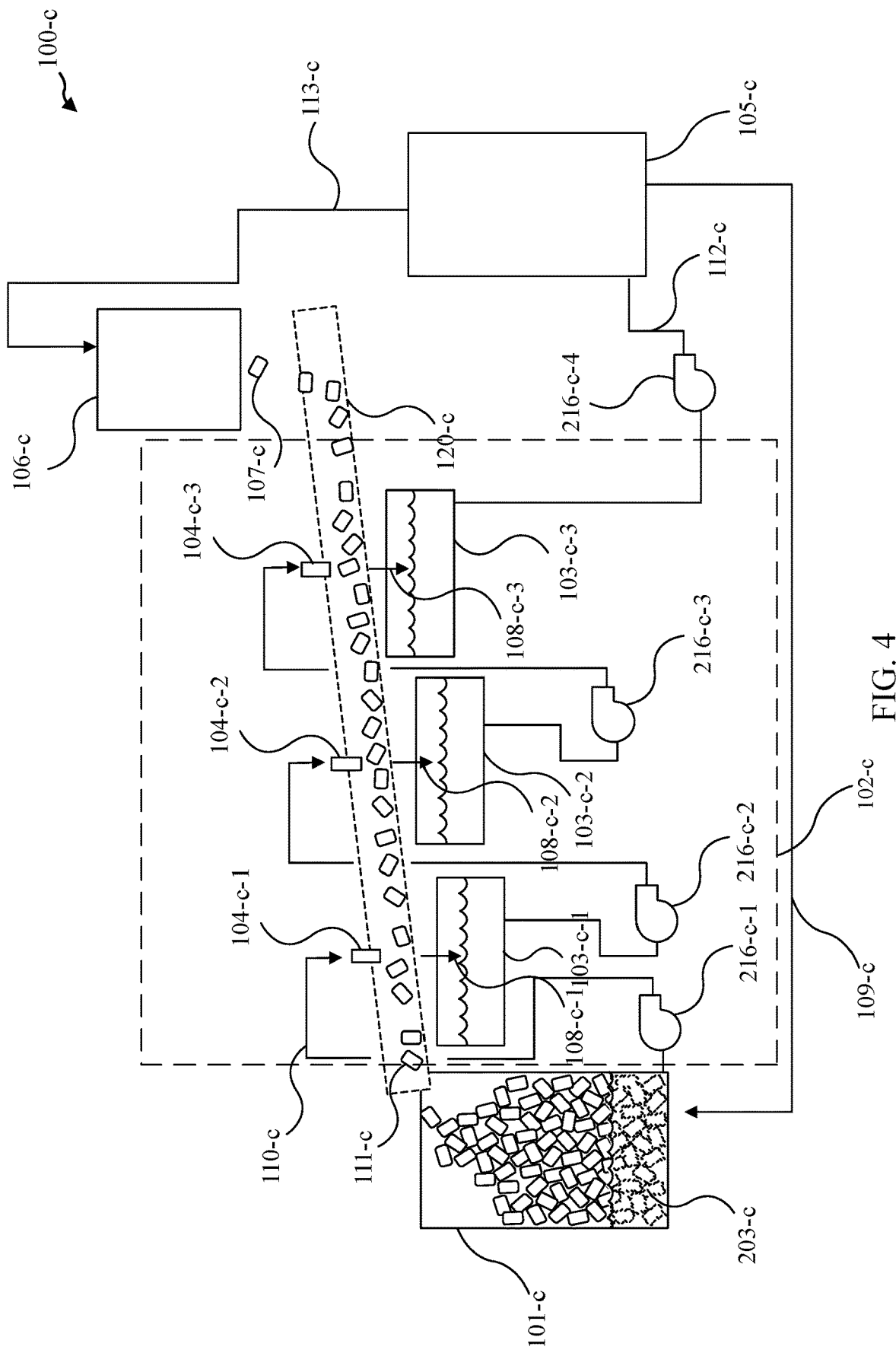
FIG. 4 shows a system and/or device in accordance with various embodiments.

FIG. 4 shows an example of a thermo-chemical recuperation system 100-*c* in accordance with various embodiments. System 100-*c* may be an example of system 100 of FIG. 1A, system 100-*ii* of FIG. 1B, and/or system 100-*iv* of FIG. 1C. A dilute brine 110-*c* may be removed from an ice mixing vessel 101-*c* (or ice tank) and cyclically injected into the thermo-chemical recuperator 102-*c* via multiple injection brine ports 104-*c*-1, 104-*c*-2, 104-*c*-3 and pumps 216-*c*-1, 216-*c*-2, 216-*c*-3; a mix of ice and brine 203-*c* within the ice-mixing vessel 101-*c* may be shown. The pumps 216-*c* may be arranged such that they may feed in series from a series of dilute bring collection vessels 103-*c*-1, 103-*c*-2, 103-*c*-3; each vessel 103-*c* may receive a respective further dilute brine 108-*c*-1, 108-*c*-2, 108-*c*-3. Each vessel 103-*c* may collect the liquid injected by the previous pump and may feed the next pump in the series; while system 100-*c* may show a series configuration; some embodiments may utilize a parallel configuration. Furthermore, while system 100-*c* may show three ports 104-*c*, three pumps 216-*c*, and three vessels 103-*c*, some embodiments may utilize more or fewer ports, pumps, and or vessels. Each stage of injection may flow over ice 107-*c* in a perforated tube 120-*c*, forming an ice flow channel, of the thermo-chemical recuperator 102-*c*, that may be falling toward the ice mixing vessel 101-*c* from an ice maker 106-*c*. The ice and brine may both fall by way of gravity and, as such, each stage of the cycle may be viewed as creating cross flow heat transfer, forming a step-wise cross flow in combination. However, as a whole, the stages in series may still produce the desired counter flow arrangement of brine flowing against the flow of ice. After a number of stages of cyclic injection sufficient to produce the desired approach temperatures in the outlet streams, further dilute brine 112-*c* may be sent to a separator 105-*c* via pump 216-*c*-4. The separator 105-*c* may produce water 113-*c*, which may be pure, and/or concentrated brine 109-*c*. The concentrated brine 109-*c* may be sent back to the ice-mixing vessel 101-*c*; the water 113-*c* may be sent to the ice maker 106-*c*. The thermo-chemical recuperator 102-*c* may create chilled ice 111-*c* that may enter the ice mixing vessel 101-*c*.

Figure 5:
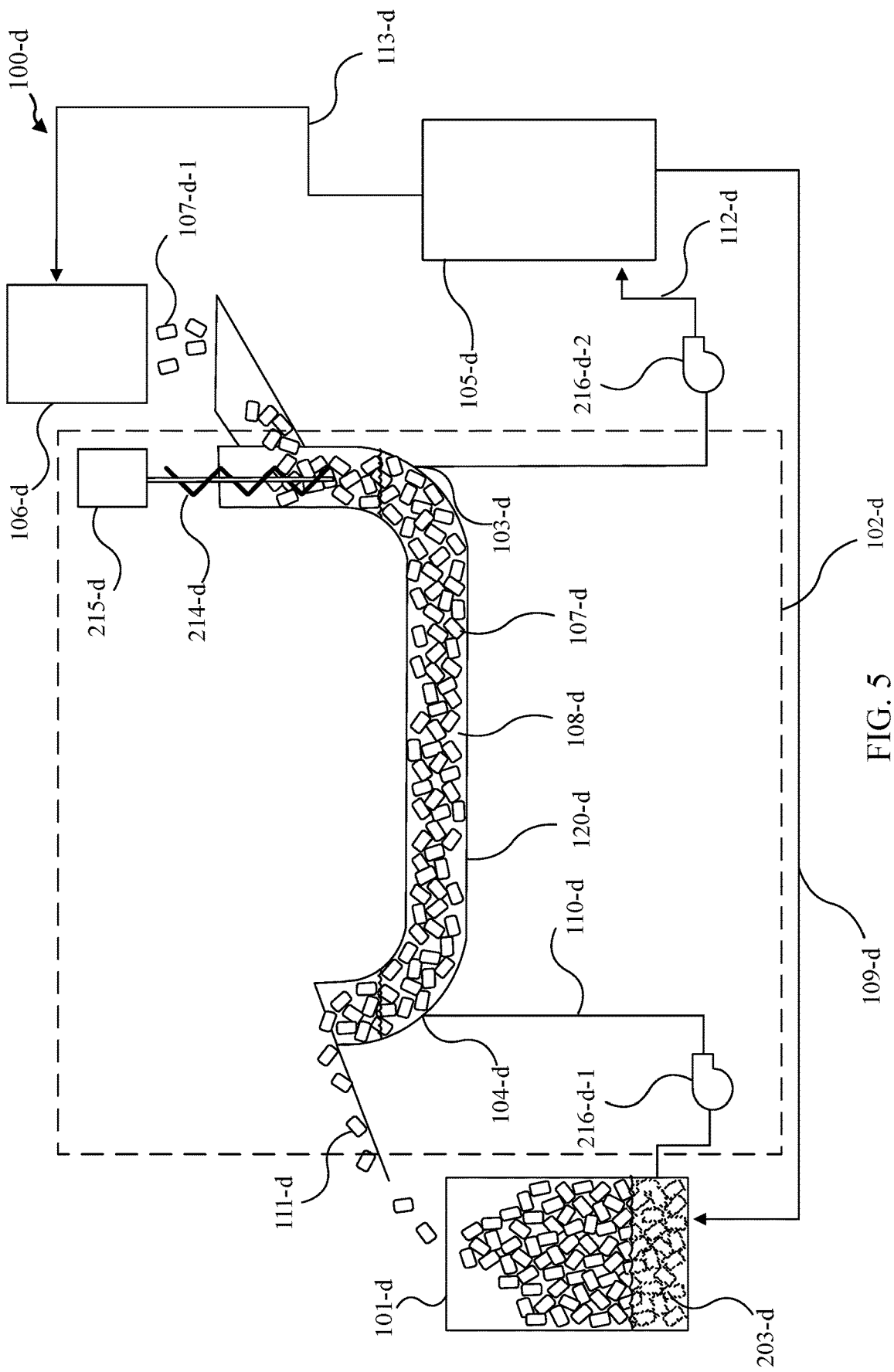
FIG. 5 shows a system and/or device in accordance with various embodiments.

FIG. 5 shows an example of a thermo-chemical recuperation system 100-*d* in accordance with various embodiments. System 100-*d* may be an example of system 100 of FIG. 1A, system 100-*iii* of FIG. 1B, and/or system 100-*iv* of FIG. 1C. Dilute brine 110-*d* may be removed from the ice mixing tank or vessel 101-*d* and injected into the thermo-chemical recuperator 102-*d* via an injection brine port 104-*d* and/or pump 216-*d*-1; a mix of ice and brine 203-*d* within the ice-mixing vessel 101-*d* may be shown. The thermo-chemical recuperator 102-*d* may include a long horizontal tube 120-*d*, forming an ice flow channel, with a path that an ice slurry can navigate without jamming. The ends of this path may be elevated to allow the path to be flooded. The brine 108-*d* may flow through the packed bed of ice 107-*d* until it reaches the end of the horizontal section where, due to the raised ends of the path, it can collect at a brine collection point 103-*d* and may be removed by a pump 216-*d*-2 and sent to the a separator 105-*d* as a further dilute brine 112-*d*. The separator 105-*d* may produce concentrated brine 109-*d*, that may be sent back to the ice mixing tank 101-*d*; water 113-*d*, which may be pure, may be sent to an ice maker 106-*d*. The ice maker 106-*d* may produce ice 107-*d*-1, which may fall into the thermo-chemical recuperator 102-*d* and may be packed into the path via an auger 214-*d* and motor 215-*d*. As the ice 107-*d* flows through the recuperator 102-*d*, it may interact with the brine 108-*d* and may leave the thermo-chemical recuperator 102-*d* colder than it entered as a subcooled ice 111-*d*.

Figure 6:
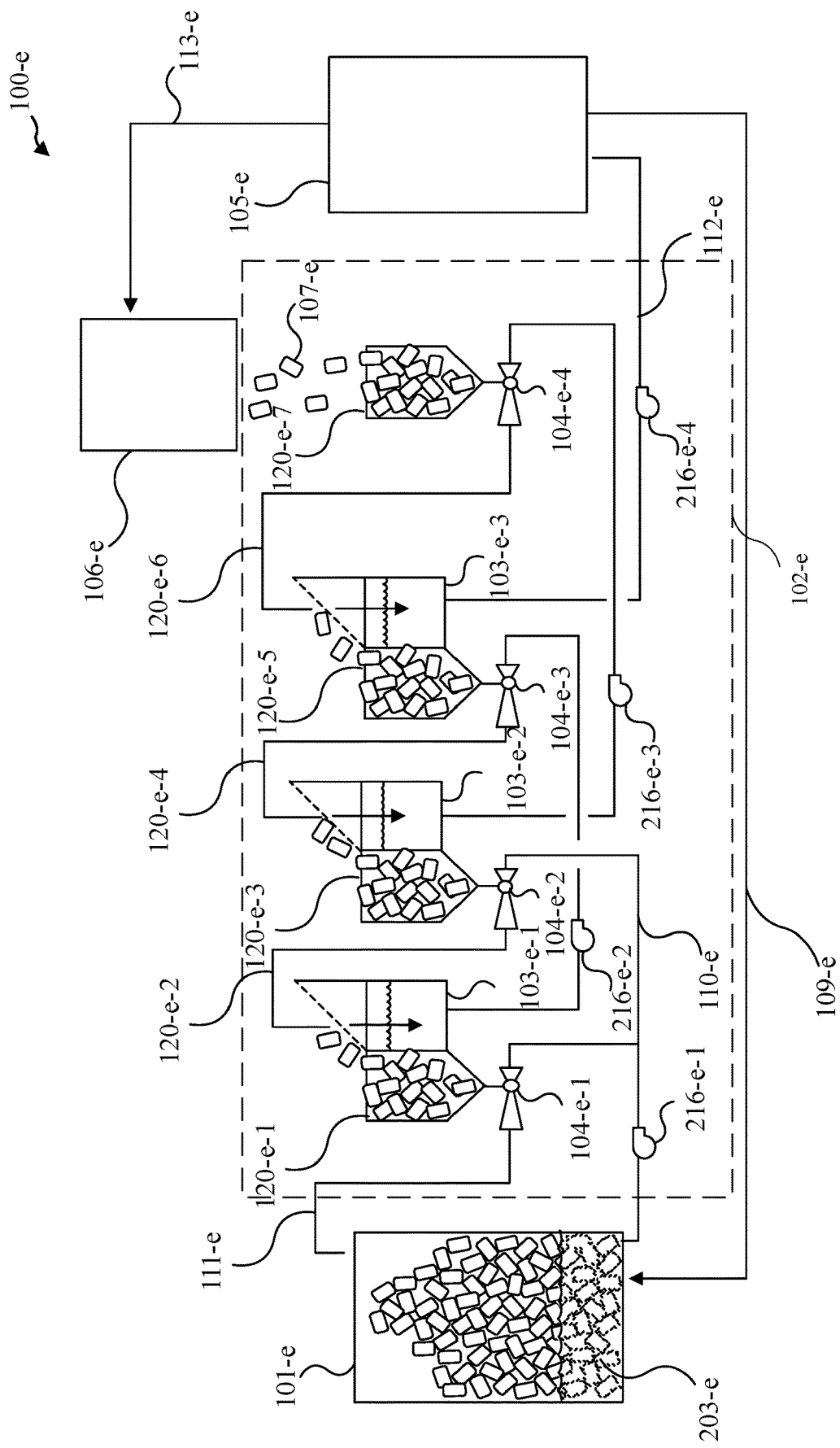
FIG. 6 shows a system and/or device in accordance with various embodiments.

FIG. 6 shows an example of a thermo-chemical recuperation system 100-*e* in accordance with various embodiments. System 100-*e* may be an example of system 100 of FIG. 1A, system 100-*iii* of FIG. 1B, and/or system 100-*iv* of FIG. 1C. Dilute brine 110-*e* may be removed from the ice mixing vessel 101-*e* (or ice tank) and cyclically injected into the thermo-chemical recuperator 102-e via multiple ejector pumps 104-e-2, 104-e-3, and 104-e-4 and mechanical pumps 216-e-1, 216-e-2, and 216-e-3; a mix of ice and brine 203-e within the ice-mixing vessel 101-e may be shown. In this example, three ejector pumps 104-e-2, 104-e-3, and 104-e-4 are shown as part of the thermo-chemical recuperator 102-e, though some embodiments may utilize more or fewer pumps; similarly, three mechanical pumps 216-e-1, 216-e-2, and 216-e-3 are shown, though some embodiments may utilize more or fewer pumps. System 100-e may include an additional ejector pump 104-e-1 that may or may not be considered as part of the thermo-chemical recuperator 102-e as its function may be to convey ice 111-e from a final stage of the thermo-chemical recuperator 102-e to the ice mixing vessel 101-e. Similarly, system 100-e may include an additional mechanical pump 216-e-4 that may or may not be considered as part of the thermo-chemical recuperator 102-e as its function may be to convey brine 112-e from a final stage of the thermo-chemical recuperator 102-e to a separator 105-e. Ejector pumps 104-e may be considered as examples of brine ports with respect to thermo-chemical recuperator 102-e.-In some embodiments, the ejector pumps 104-e are venturi nozzles. The pumps 104-e and/or 216-e may be arranged such that they feed in series from a series of dilute brine collection vessels 103-e-1, 103-e-2, and 103-e-3, again, while three vessels 103-e may be shown, other embodiments may utilize more or fewer vessels. The ejector pump 104-e for each stage may pick up ice into the brine flow and may use hydrodynamic forces to convey the ice to the next stage of the cycle through interconnecting piping 120-e-2, 120-e-4, and/or 120-e-6, which may form part of one or more ice flow channels Each vessel 103-e may collect the liquid injected by the previous pump and may feed the next pump in the series. The ice and brine may be separated before liquid is collected in the respective vessel 103-e (such as through the perforated portions shown at the top of each vessel 103-e), while the ice may be collected in hoppers, such as hoppers 120-e-1, 120-e-3, and/or 120-e-5. These hoppers 120-e-1, 120-e-3, and 120-e-5 may form part of one or more ice flow channels. The cyclic injection and removal of the ice via the ejectors 104-e and/or vessels 103-e may thus form one or more ice flow channels through the use of hoppers 120-e-1, 120-e-3, and/or 120-e-5 and the interconnecting piping. 120-e-2, 120-4, and/or 120-e-6. In this way, the ice may move from right to left in FIG. 6, while the brine may move from left to right, creating a step-wise cross flow or counterflow configuration with the ice and brine flow against each other overall. System 100-e may include an additional hopper 120-e-7 that may or may not be considered as part of the thermo-chemical recuperator 102-e as its function may be to convey ice 107-e into the initial stage of the thermo-chemical recuperator 102-e. In the left-most stage, subcooled ice may be sent 111-e to the tank 101-e using the last ejector 104-e-1. In the right-most stage of the thermo-chemical recuperator 102-e, the further diluted brine 112-e may be removed by a pump 216-e-4 and sent to the separator 105-e where it may be separated into water 113-e and concentrated bring 109-e. The brine 109-e may be sent back to the ice mixing tank 101-e, while the water 113-e may be sent to an ice maker 106-e, where it may be turned into ice 107-e.

Figure 7:
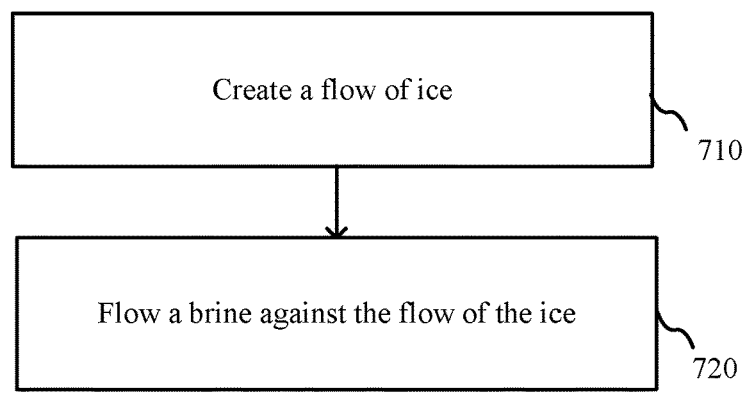
FIG. 7 shows a flow diagram of a method in accordance with various embodiments.

Turning now to FIG. 7, a flow diagram of a method of thermo-chemical recuperation 700 is shown in accordance with various embodiments. Method 700 may be implemented utilizing a variety of systems and/or devices such as those shown and/or described with respect to FIG. 1A, FIG. 1B, FIG. 1C, FIG. 2, FIG. 3, FIG. 4, FIG. 5, and/or FIG. 6.

At block 710, a flow of ice may be created. At block 720, a brine may be flowed against the flow of the ice. In some embodiments, flowing the brine against the flow of the ice includes forming a counter flow of the brine against the flow of the ice. In some embodiments, flowing the brine against the flow of the ice includes forming a step-wise cross flow of the brine against the flow of the ice. In some embodiments, forming the step-wise cross flow of the brine against the flow of the ice includes cyclically injecting the brine at a plurality of points with respect to the flow of the ice.

In some embodiments of method 700, flowing the brine against the flow of the ice reduces a temperature of the brine. In some embodiments, flowing the brine against the flow of the ice dilutes the brine. In some embodiments, flowing the brine against the flow of the ice reduces a temperature of the ice.

Some embodiments of the method 700 include delivering the flow of the ice to an ice tank after flowing the brine against the flow of the ice. Some embodiments include passing the brine through a separator after the brine flows against the flow of the ice. In some embodiments, the separator forms at least a concentrated brine or water from the brine.

Some embodiments include freezing the water from the separator to form ice for the flow of the ice. Some embodiments include combining the ice in an ice tank with the concentrated brine after flowing the brine against the flow of the ice.

In some embodiments of the method 700, flowing the brine against the flow of the ice utilizes gravity for flowing the brine against the flow of the ice. In some embodiments, creating the flow of the ice flows the ice against gravity. In some embodiments, creating the flow of the ice flows the ice with gravity.

In some embodiments of method 700, the flow of the ice and flowing the brine against the flow of the ice occurs horizontally. In some embodiments, the flow of the ice and flowing the brine against the flow of the ice that occurs horizontally includes flowing the ice and the brine through a tube that includes a horizontal portion. Some embodiments include utilizing an auger to pack the ice into the tube that includes the horizontal portion.

In some embodiments of method 700, creating the flow of the ice utilizes at least an auger or a chain conveyor. Some embodiments may utilize a bucket conveyor. Some embodiments may utilize a belt conveyor.

These embodiments may not capture the full extent of combination and permutations of materials and process equipment. However, they may demonstrate the range of applicability of the method, devices, and/or systems. The different embodiments may utilize more or less stages than those described.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of stages may be undertaken before, during, or after the above elements are considered. Accordingly, the above description should not be taken as limiting the scope of the different embodiments.

What is claimed is:

1. A thermo-chemical recuperation system comprising;
   one or more ice flow channels;
   one or more brine ports, wherein the one or more ice flow channels and the one or more brine ports are positioned with respect to each other such that a flow of brine from the one or more brine ports is against a flow of the ice through the one or more ice flow channels; and
   a separator positioned to receive the brine after the brine flows against the flow of the ice, wherein:
   the separator forms at least a concentrated brine or water from the brine; and
   the separator is coupled with an ice tank such that the concentrated brine is delivered to the ice tank.

2. The system of claim 1, wherein at least the one or more ice flow channels or the one or more brine ports are positioned to form a counter flow of the brine against the flow of the ice.

3. The system of claim 1, wherein at least the one or more ice flow channels or the one or more brine ports are positioned to form a step-wise cross flow of the brine against the flow of the ice.

4. The system of claim 3, wherein the step-wise cross flow of the brine against the flow of the ice includes cyclically injecting the brine from a plurality of brine ports from the one or more brine ports with respect to the flow of the ice through the one or more ice flow channels.

5. The system of claim 1, wherein at least the one or more ice flow channels or the one or more brine ports are positioned such that the brine flows with gravity against the flow of the ice.

6. The system of claim 5, wherein at least the one or more ice flow channels or the one or more brine ports are positioned such that the flow of the ice flows the ice against gravity.

7. The system of claim 1, wherein at least the one or more ice flow channels or the one or more brine ports are positioned such that the flow of the ice flows the ice with gravity.

8. The system of claim 1, wherein at least the one or more ice flow channels or the one or more brine ports are positioned such that flow of the ice and the flow of the brine against the flow of the ice occurs horizontally.

9. The system of claim 1, further comprising an auger positioned with respect to the one or more ice flow channels to create the flow of the ice.

10. The system of claim 1, further comprising a chain conveyor positioned with respect to the one or more ice flow channels to create the flow of the ice.

11. The system of claim 1, further compromising an ice tank positioned to receive the flow of the ice after the ice flows through the one or more ice channels.

12. The system of claim 1, wherein the one or more ice flow channels include at least a tube that includes a horizontal portion.

13. The system of claim 12, further comprising an auger that packs the ice into the tube that includes the horizontal portion.

14. The system of claim 1, further comprising an ice maker to form the ice for the flow of the ice.

15. The system of claim 14, wherein the separator is coupled with the ice maker such that the water from the separator is delivered to the ice maker to form the ice for the flow of the ice.

* * * * *